(12) United States Patent
Luft et al.

(10) Patent No.: US 6,506,279 B1
(45) Date of Patent: Jan. 14, 2003

(54) HIGH-RESISTANT CONDENSATION CROSS-LINKING SILICON

(75) Inventors: Werner Luft, Reitmehring (DE); Michael Futscher, Nussdorf (DE)

(73) Assignee: Heidelberger Bauchemie GmbH, Heidelberg (DE)

( * ) Notice: Subject to any disclaimer, the term of this patent is extended or adjusted under 35 U.S.C. 154(b) by 0 days.

(21) Appl. No.: 09/744,174

(22) PCT Filed: Jul. 8, 1999

(86) PCT No.: PCT/EP99/04799

§ 371 (c)(1),
(2), (4) Date: Jan. 19, 2001

(87) PCT Pub. No.: WO00/05298

PCT Pub. Date: Feb. 3, 2000

(30) Foreign Application Priority Data

Jul. 21, 1998 (DE) .......................................... 198 32 686

(51) Int. Cl.$^7$ ........................ C09J 183/04; C08G 77/04; C08L 83/04
(52) U.S. Cl. ........................ 156/329; 524/588; 528/15; 528/16; 528/23; 528/34
(58) Field of Search ............... 528/15, 16, 23, 528/24; 524/588; 152/329

(56) References Cited

U.S. PATENT DOCUMENTS

| | | | |
|---|---|---|---|
| 4,489,199 A | 12/1984 | Wengrovius | 528/16 |
| 4,532,315 A | 7/1985 | Letoffe et al. | 528/14 |
| 4,533,503 A | 8/1985 | Wengrovius | 556/173 |
| 4,739,026 A * | 4/1988 | Riederer et al. | 528/33 |
| 4,748,166 A | 5/1988 | Gautier et al. | 524/13 |
| 4,956,227 A * | 9/1990 | Hirayama et al. | 428/331 |
| 5,070,132 A * | 12/1991 | Peccoux et al. | 524/492 |
| 5,288,831 A * | 2/1994 | Ichinobe et al. | 528/25 |
| 6,284,860 B1 * | 9/2001 | Sommer et al. | 528/23 |
| 6,307,192 B1 * | 10/2001 | Ulfstedt et al. | 219/725 |

FOREIGN PATENT DOCUMENTS

EP        0 021 859       1/1981

* cited by examiner

*Primary Examiner*—Robert Dawson
*Assistant Examiner*—Jeffrey B. Robertson
(74) *Attorney, Agent, or Firm*—Foley & Lardner

(57) ABSTRACT

The present invention relates to a kit for producing condensation cross-linking silicon mixtures containing bi-functionally terminated diorganopolysiloxanes, acetoxysilane cross-linking agents, and optionally, filling materials, suitable additives, pigments, colorants, anti-oxidation pigments, anti-heat pigments, and light-protection pigments in addition to solvents and plasticizers. Said kit contains water and an accelerator in the form of a basic neutral iron or aluminum salt with a mineral acid, especially an aluminum alum of ammonia and/or alkaline metals, as an accelerating cross-linking agent.

19 Claims, No Drawings

HIGH-RESISTANT CONDENSATION CROSS-LINKING SILICON

The present invention concerns a kit for the production of condensation cross-linking silicone mixtures of at least bifunctionally-terminated diorgano-polysiloxanes, acetoxysilane cross-linking agents, as well as possibly filling materials, suitable additives, pigments, colouring materials, oxidation, heat and light protection pigments, as well as solvents and plasticisers.

Such organopolysiloxane mixtures, also known as cold-vulcanising, monocomponent silicone rubbers, usually cross-link at room temperature with the take up of water from the surrounding atmosphere to give rubber-elastic polymers. As chain lengtheners and cross-linkers, there are used bi- and preferably higher functional acetoxysilane compounds which, by reaction with the polysiloxane or by hydrolysis, split off acetic acid and thus initiate the formation of a macromolecular mesh-work. After hardening has taken place, such masses are characterised by good inherent adhesion on the most varied material surfaces and by a generally high stability against the action of temperature, light, moisture, as well as chemicals.

The hardening of such monocomponent polysiloxane mixtures cross-linking at room temperature with the take up of moisture takes place comparatively slowly since the water necessary for the reaction must diffuse from the surrounding atmosphere into the interior of the mass. Therefore, the speed of the hardening through decreases with progressive reaction in the interior of the mass. In the case of low atmospheric humidity or in the case of an unfavourable ratio of surface to volume of the silicone mass, the reaction can become very slow or, as in vapour-tight closed off rooms, can also stop completely.

The per se multiple possibilities of use of such atmospheric moisture-hardening silicones as sealing or adhesive materials are, especially in the case of use in industrial fabrication, limited because of the slow hardening. Admittedly, bicomponent silicone rubber systems hardening rapidly at room temperature or also first at higher temperatures are known but their use fails frequently in the deficient inherent adhesion or also the comparatively low temperature resistance of these products. However, if one uses silicones hardening only slowly under the influence of atmospheric humidity, in the case of the short cycle times desired for economic reasons, large intermediate storage for sealed off or adhered parts are necessary in order to ensure the hardening. These intermediate storages must possibly be additionally climatised or moistened. Under certain circumstances, in this way already very large numbers of pieces are produced before, for the first time, a testing for freedom from faults and function of the goods produced is possible. Large-surface adhesions between diffusion-impervious surfaces are, in practice, just as little capable of being carried out with atmospheric moisture-hardening silicones as the production of formed bodies in closed moulds.

If one adds water in liquid form to the known acetoxysilane-containing and atmospheric moisture-hardening masses, in comparison with the cross-linking with atmospheric moisture, a certain acceleration of the hardening is achieved. However, this form of cross-linking does not lead to end products with material properties as are obtained in the case of pure atmospheric moisture cross-linking. On the contrary, masses result which, over the course of time, remain substantially softer, display poor inherent adhesion and are also swollen for a very long time with the acetic acid resulting as cross-linking fission product.

Similar results, thus only slight hardening acceleration bound up with comparatively poorer material properties and with long persisting smell of acetic acid are obtained when water is added in the form of water of crystallisation-containing neutral salts or also knowingly surface-moistened materials.

From U.S. Pat. No. 4,532,315, it is known that acetate-hardening silicone masses harden more quickly by addition of hydroxides of the alkali and alkaline earth metals and possibly addition of water. There are thereby used the water of crystallisation-containing forms of the hydroxides or water is additionally added to the mixture. The basic compounds react with the cleavage product, the acetic acid, with salt formation, whereby the reaction equilibrium is forced to the side of the products. The alkali added to the system and water initiates the hydrolysis reaction of the acetoxy groups of the cross-linker and, in this way, accelerates the formation of the polymer structure.

An important disadvantage of the known condensation cross-linking silicones is their limited strength. Whereas addition cross-linking systems achieve tear strengths of up to 7 $N/mm^2$, the tear strengths of the condensation cross-linking systems lie at max. 2 $N/mm^2$, mostly however distinctly thereunder. From this results a greatly limited possibility of use of the condensation cross-linked silicones to uses in which a high stretch-ability of the adhesion/sealing material is necessary. In the case of adhesions which are exposed to high, shock-like loadings or vibrations, hitherto no condensation cross-linking systems have been used.

Thus, the task forming the basis of the invention is to make available a kit for the production of sealing and adhesive masses based on condensation cross-linking acetoxysilane-polysiloxane mixtures, whereby an accelerated hardening after mixing of the kit is achieved and, furthermore, a high strength of the polymer material is achieved. The silicone masses produced from the kits according to the invention are to harden within a short time, i.e. within a few minutes up to a few hours and independently of the surrounding atmospheric humidity, whereby, besides the typical characteristics of the previously known vulcanisates, such as for example inherent adhesion, stability and mechanical properties, especially the tensile strength and the temperature stability of the acceleratedly hardened silicone is to be improved.

It has now been found that this task is solved when one replaces the hydroxides of the alkali and alkaline earth metals acting as accelerator according to U.S. Pat. No. 4,532,315 by water of crystallisation-containing acidic neutral salts of aluminium or iron with mineral acids, preferably by the alums but also, for example, aluminium sulphate or iron phosphate. In the case of use especially of the aluminium alums of ammonium and of the alkali metals, besides the accelerated action, in comparison with the air hardening, on the hardening, a simultaneously extraordinarily improved tensile strength or tear strength of the silicones polymerised under these conditions can be achieved. Amongst the acidic neutral salts, to which also belong the alums, are understood compounds in which theoretically all ionisable hydrogen atoms of the acid are replaced by other cations and only via the differing degree of dissociation of the underlying acids the aqueous solutions of the salts react acidicly, especially in the case of 1 molar solutions pH values of below 5, preferably below 4 are obtained. It is surprising that such compounds can be advantageously used instead of the alkalis and thereby produce an increased strength of the silicones. A certain difference consists in that the silicones accelerated in this way require a longer reaction time in comparison with, for example, basic salts.

The task forming the basis of the invention is solved by the features of the main claim and promoted by those of the subsidiary claims. Such kits for the production of the mixtures are characterised in that they contain at least the following components:

A) 100 wt. parts of an at least bifunctionally terminated diorganopolysiloxane, which is built up of a linear or branched chain of repeating units of the formula

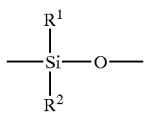

and—as illustrated in the following in the case of a linear chain—is terminated with functional end groups Z

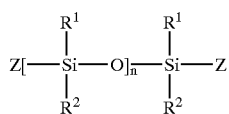

There hereby mean:
$R^1$, $R^2$: saturated or unsaturated hydrocarbon radicals with 1–15 carbon atoms, possibly substituted with halogen or cyano groups
Z: —H, —OH, $OR^1$ and —$SiR^3(OCOR^4)_2$
$R^3$: hydrogen or monovalent saturated or unsaturated hydrocarbon or hydrocarbonoxy radical with 1–15 carbon atoms,
$R^4$: hydrogen and/or saturated or unsaturated aliphatic, cycloaliphatic or aromatic hydrocarbon radicals with 1–15 carbon atoms, possibly substituted with halogen or cyano groups.

B) 0.1 to 20 wt. parts of an acetoxysilane cross-linker of the general formula

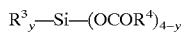

whereby y=0 or 1 and $R^3$, $R^4$ have the above meaning.
C) 0.1 to 20 wt. parts of an accelerator in the form of an acidic neutral salt of aluminium or iron, preferably of an alum, especially the aluminium alum of ammonium and of the alkali metals,
D) 0 to 20 wt. parts of water.

As examples for the radicals $R^1$ and $R^2$ of the components A are to be mentioned any desired saturated alkyl radicals, such as methyl, ethyl, n-propyl, isopropyl, octyl, dodecyl, octadecyl, but also cyclic, such as cyclopentyl and cyclohexyl. Within a polysiloxane, the radicals $R^1$ and $R^2$ can be of the same or also different structure. It is also possible to mix branched and unbranched polysiloxanes with the above-described construction and in different chain lengths. Preferably, there are used polysiloxanes terminated with hydroxyl groups, so-called α,ω-dihydroxydiorganopolysiloxanes with methyl and phenyl radicals.

The said radicals can also be used in halogen- and cyano-substituted forn. Examples herefor are 1,1,1-trifluorotoluyl, β-cyanoethyl or o-, m- or p-chlorophenyl radicals.

The viscosity of the diorganopolysiloxanes preferably lie in the range of 500 to 350000 mPas.

Besides hydrogen, the radical $R^3$ can be of the same construction as the radicals $R^1$ and $R^2$. Simple alkyl radicals, such as methyl or ethyl, are preferably used.

The radical $R^4$ can have the same construction as the radicals $R^1$, $R^2$ or $R^3$, whereby the radicals can also be hydrogen.

As components C are suitable acidic neutral salts of aluminium or of iron with mineral acids, preferably the alums, such as for example iron and aluminium alums with acidic properties, especially the aluminium alums of ammonium and of the alkali metals, but also aluminium sulphate or iron phosphate.

Component D can be added to the mixture not only in liquid form but also bound as water crystallisation, for example as sodium sulphate decahydrate, or enclosed in zeolites and also absorbed on the surface of filling materials, such as for example calcium carbonate, or water absorbed on silica gel. However, the necessary water is preferably added exclusively bound with the components C bound as water of crystallisation.

To the mixtures of the components A to D can be added further materials for the achievement of special properties. To be mentioned are here especially coloured pigments and soluble dyestuffs, stabilisers against oxidation and the action of heat, dispersers, reaction catalysts, fungicides, bonding agents, solvents, flame protection agents, plasticisers (preferably silicone oils but also on hydrocarbon basis), strengthening filling materials, such as for example highly dispersed or precipitated silicic acids, graphite, carbon black, as well as passive filling materials, such as e.g. calcium carbonate, silicates, quartz meal, glass and carbon fibres, diatomaceous earths, metal powders, metal oxides, synthetic material powders, as well as hollow spheres of glass or synthetic materials the polar surface of which is hydrophobed.

Mixtures of the components A to D are not storage stable. The components C and D necessary for the reaction acceleration are, therefore, admixed with the mixture of the components A and B immediately before use in a suitable mould, preferably pasted in silicone oils or polymers.

The present invention also concerns processes for the production of a sealing or adhesive mixture or moulding mass on the basis of at least bifunctionally-terminated diorganopolysiloxanes and acetoxy cross-linkers which are characterised in that A) 100 wt. parts of such a diorganopolysiloxane, whereby this is made up of a linear or branched chain of repeating units of the formula

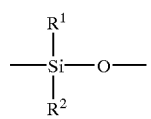

and, corresponding to the following formula concerning the special case of linear chains

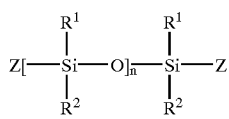

is terminated with functional end groups Z, and whereby
$R^1$, $R^2$ are saturated or unsaturated hydrocarbon radicals with 1–15 carbon atoms, possibly substituted with halogen or cyano groups,
Z —H, —OH, $OR^1$ and $SiR^3(OCOR^4)_2$
$R^3$ hydrogen or a monovalent saturated or unsaturated hydrocarbon or hydrocarbonoxy radical with 1–15 carbon atoms R⁴ hydrogen and/or saturated or unsaturated aliphatic, cycloaliphatic or aromatic hydrocarbon radical with 1–15 carbon atoms, possibly substituted with halogen or cyano groups, B) 0.1 to 20 wt. parts of an acetoxysilane cross-linker of the general formula

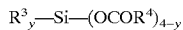
$$R^3_y\!-\!Si\!-\!(OCOR^4)_{4-y}$$

whereby Y=0 or 1 and $R^3$, $R^4$ have the above meaning, as well as possibly coloured pigments or soluble dyestuffs, stabilisers against oxidation and action of heat, dispersers, reaction catalysts, fungicides, bonding agents, solvents, flame-protection agents, plasticisers (preferably silicone oils but also plasticisers on hydrocarbon basis), furthermore active, strengthening filling materials, such as for example highly dispersed or precipitated silicic acids, graphite, carbon black, as well as passive filling materials, such as e.g. calcium carbonate, silicates, quartz meal, glass and carbon fibres, diatomaceous earth, metal powders, metal oxides, synthetic material powders, as well as hollow spheres of glass or synthetic materials, are mixed with one another and, immediately before use, there are added thereto C) 0.1 to 20 wt. parts of an accelerator in the form of an acidic neutral salt of aluminium or iron, preferably of an alum, especially the aluminium alums of ammonium or of the alkali metals, D) 0 to 20 wt. parts of water,
possibly pasted in silicone oils or polymers.

The mixtures prepared with the help of the kit according to the invention harden at room temperature in 45 minutes to 3 hours to a solid, adhesion-free and cuttable mass. Increased temperature in the case of the hardening (about 40° C.) brings about an additional acceleration. The mixtures adhere themselves to substrates of glass, ceramic, wood, metals and synthetic resins. Therefore, the mixtures according to the invention are preferably used for the adhesion of metals, glass and synthetic materials, especially in constructioal parts in which vibrations arise, for example in the production of machines, motors, in automobile and aircraft construction, as well as in the household apparatus industry, especially in the manufacture of cooking machines.

In the following, the invention is explained in more detail on the basis of an Example (the statements of percentage refer to weight %).

EXAMPLE

Component I consisting of
61.2% of an α, ω-dihydroxydimethylpolysiloxane with a viscosity of 6000 mPa·s,
14.4% of a surface-treated pyrogenic highly dispersed silicic acid with a specific surface according to BET of about 140±50 m²/g,
4% triacetoxymethylsilane
0.4% of other additives
are homogeneously mixed together at room temperature with a component II consisting of
13.6% of an α, ω-dihydroxydimethylpolysiloxane with a viscosity of 80,000 mPa·s,
4% of a surface-treated pyrogenic highly-dispersed silicic acid with a specific surface according to BET of about 140±50 m²/g,
2.3% of an ammonium aluminium sulphate dodecahydrate with a grain size of <100 μm.

The silicone mixtures produced from the components of a kit according to the invention were hardened after about 45 minutes at room temperature with exclusion of atmospheric moisture and thereby achieved a Shore A hardness of about 45. Under these conditions, both components I and II remain storage-stable pastes.

Furthermore, a rapidly built up inherent adhesion on various substrates, especially glass, metals and synthetic materials, was achieved.

The silicones condensation polymerised in this way show an extraordinary tensile and tear strength which, in comparison, lie distinctly over the value of just 1.5 N/mm² for monocomponent unaccelerated, atmospheric moisture-hardening systems and also distinctly over the value of a two-component unaccelerated atmospheric moisture-hardening system (of components A and B) of 2.2 N/mm² after one week at 23° C. For the measurement of the tensile strength, glued aluminium bodies were prepared with an adhesion surface of 15×50 mm and a layer thickness of 0.6 mm. A silicone produced according to the above Example thereby showed the following tensile strength values:

|  | tensile strength | breaking elongation |
|---|---|---|
| after 24 h | 2.9 N/mm² | 300% |
| after 72 h | 4.1 N/mm² | 260% |
| after 144 h | 4.3 N/mm² | 240% |

In the following Table are reproduced further experiments with other alums, whereby the components I and II, as well as the production were carried out according to the preceding Example.

The silicone masses produced in this way were hardened between 45 min and 3 h in the core and were cuttable. The amount of water introduced via the accelerator substance there amounts, in each case, to about 0.3 g/100 g of components.

| accelerator | water of crystallisation | pH value | mixing ratio I:II (wt. parts) | hardened/ cuttable | tensile strength (after 7 d) |
|---|---|---|---|---|---|
| acidic neutral salts | | | | | |
| NH₄Al(SO₄)₂ | 12 | 3–4.5 | 100:25 | 45 min | 4.3 N/mm² |
| NH₄Fe(SO₄)₂ | 12 | 1 | 100:25 | about 3 h | |
| KAl(SO₄)₂ | 12 | 3–3.5 | 100:25 | about 3 h | |
| Al₂(SO₄)₃ | 18 | 3–4 | 100:25 | >3 h | |
| FeSO₄ | 7 | 3–4 | 100:25 | about 3 h | |
| FePO₄ | 4 | | 100:25 | about 1 h | |
| without accelerator (comparison) | | | | | |
| atmospheric moisture | | | 100:0 | >7 d | 2.2 N/mm² |
| H₂O (liquid) | | | | 1–2 d | |
| SiO₂ × H₂O | | | | >>8 h | |

The silicone masses according to the invention produced in this manner show a rapidly built up inherent adhesion to various substrates, especially glass, metals and synthetic materials.

What is claimed is:
1. Kit for the production of rapidly-hardening, acetoxysilane cross-linking silicone masses of at least bifunctionally-terminated diorganopolysiloxanes, and acetoxysilane cross-linkers, which contain the following components:

A) 100 wt. parts of an at least bifunctionally terminated diorganopolysiloxane, whereby said bifunctionally terminated diorganopolysiloxane is built up from linear or branched chain of repeating units of the formula

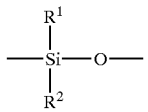

and contains at least two end groups Z with
Z: —H, —OH, —OR$^1$ and SiR$^3$(OCOR$^4$)$_2$
R$^1$, R$^2$: saturated or unsaturated hydrocarbon radicals with 1 to 15 carbon atoms,
R$^3$: hydrogen or monovalent saturated or unsaturated hydrocarbon or hydrocarbonoxy radicals with 1–15 carbon atoms.
R$^4$: hydrogen and/or saturated or unsaturated aliphatic, cycloaliphatic or aromatic hydrocarbon radical with 1–15 carbon atoms, B) 0.2 to 20 wt. parts of an acetoxysilane cross-linker of the general formula

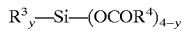

whereby y=0 or 1 and R$^3$, R$^4$ have the above meaning,
C) 0.1 to 20 wt. parts of an accelerator
D) 0 to 20 wt. parts of water,
characterised in that the accelerator in component C is a neutral salt of iron or aluminum with a mineral acid.

2. Kit according to claim 1, wherein the accelerator component C is an alum.

3. Kit according to claim 1, wherein the accelerator component C is an aluminum alum of ammonium and/or of the alkali metals.

4. Kit according to claim 1, wherein the accelerator component C is present in water of crystallisation-containing form.

5. Kit according to claim 1, wherein water of crystallisation-hydrated materials or water adsorbed on zeolites or silica gels or filling material surfaces is used as component D.

6. Kit according to claim 1, wherein there are additionally contained coloured pigments or soluble dyestuffs, stabilisers against oxidation and action of heat, dispersers, reaction catalysts, fungicides, bonding agents, solvents, flame protection agents, plasticisers, strengthening filling materials, and passive filling materials, in the components A–D.

7. Kit according to claim 1, wherein as diorganopolysiloxane component A, there is used an α,ω-dihydroxydiorganopolysiloxane.

8. Process for the production of a sealing or adhesive material mixture based on diorganopolysiloxanes and acetoxy cross-linkers, wherein components A and B according to claim 1 are mixed to give a first pre-mixture and the components C and D are mixed to give a second pre-mixture and the two pre-mixtures are combined shortly before use to give the effective sealing or adhesive mixture.

9. Process according to claim 8, wherein component C comprises alum and component D comprises water of crystallisation-hydrated materials, water absorbed on zeolites or silica gels or adsorbed in filling material surfaces.

10. Process according to claim 8, comprising pasting components C and/or D and adding either (i) a plasticiser based on silicone or (ii) a diorganopolysiloxane polymer comprising a bifunctionally terminated diorganopolysiloxane, whereby said bifunctionally terminated diorganopolysiloxane is built up from a linear or branched chain of repeating units of the formula

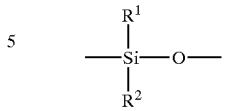

and contains at least two end groups Z with
Z: —H, —OH, —OR$^1$, and SiR$^3$(OCOR$^4$)$_2$
R$^1$, R$^2$: saturated or unsaturated hydrocarbon radicals with 1 to 15 carbon atoms,
R$^3$: hydrogen or monovalent saturated or unsaturated hydrocarbon or hydrocarbonoxy radicals with 1–15 carbon atoms and
R$^4$: hydrogen and/or saturated or unsaturated aliphatic, cycloaliphatic or aromatic hydrocarbon radicals with 1 to 15 carbon atoms.

11. Process according to claim 8, wherein said bifunctionally terminated diorganopolysiloxane comprises α,ω-dihydroxydiorganopolysiloxane.

12. Process for sealing or adhering, comprising applying mixtures of the kit according to claim 1 to a surface to be sealed or adhered and sealing or adhering said surface.

13. Process for producing a molded mass, comprising molding mixtures of the kit according to claim 1 into a desired shape.

14. A process according to claim 10, wherein R$^1$ and/or R$^2$ is a saturated or unsaturated hydrocarbon radical with 1 to 15 carbon atoms which is substituted with halogen or cyano groups.

15. Kit according to claim 6, wherein the plasticisers comprise one or more of silicone oils and plasticisers based on hydrocarbons; the strengthening filling materials comprise one or more of highly dispersed or precipitated silicic acids, graphite and carbon black; and the passive filling materials comprise one or more of calcium carbonate, silicates, quartz meal, glass and carbon fibres, diatomaceous earth, metal powders, metal oxides, synthetic material powders, and hollow spheres of glass or synthetic materials.

16. A kit according to claim 1, wherein said kit further comprises at least one of the following:
filling materials, stabilisers against oxidation or heat, dispersers, reaction catalysts, fungicides, bonding agents, solvents, flame protection agents, plasticisers, or pigments.

17. A kit according to claim 1, wherein R$^1$ and/or R$^2$ is a saturated or unsaturated hydrocarbon radical with 1 to 15 carbon atoms which is substituted with halogen or cyano groups.

18. A process according to claim 10 wherein said kit further comprises coloured pigments or soluble dyestuffs, stabilisers against oxidation and action of heat, dispersers, reaction catalysts, fungicides, bonding agents, solvents, flame-protection agents, plasticisers, strengthening filling materials, or passive filling materials.

19. Process according to claim 14, wherein the plasticisers comprise one or more of silicone oils and plasticisers based on hydrocarbons; the strengthening filling materials comprise one or more of highly dispersed or precipitated silicic acids, graphite and carbon black; and the passive filling materials comprise one or more of calcium carbonate, silicates, quartz meal, glass and carbon fibres, diatomaceous earth, metal powders, metal oxides, synthetic material powders, and hollow spheres of glass or synthetic materials.

* * * * *